(12) United States Patent
Fujita et al.

(10) Patent No.: US 7,406,375 B2
(45) Date of Patent: Jul. 29, 2008

(54) ELECTRIC POWER STEERING APPARATUS AND METHOD FOR CONTROLLING THE ELECTRIC POWER STEERING APPARATUS

(75) Inventors: Shuji Fujita, Nishikamo-gun (JP); Eiji Kasai, Toyota (JP); Ippei Yamazaki, Toyota (JP); Junro Yamamoto, Susono (JP); Yasunori Shintani, Nagoya (JP); Hideo Kometani, Toyota (JP)

(73) Assignees: Toyota Jidosha Kabushiki Kaisha, Toyota-shi (JP); JTEKT Corporation, Chuo-ku (JP)

( * ) Notice: Subject to any disclaimer, the term of this patent is extended or adjusted under 35 U.S.C. 154(b) by 0 days.

(21) Appl. No.: 11/852,817

(22) Filed: Sep. 10, 2007

(65) Prior Publication Data

US 2008/0066994 A1 Mar. 20, 2008

(30) Foreign Application Priority Data

Sep. 15, 2006 (JP) ............................. 2006-250217

(51) Int. Cl.
*B62D 5/04* (2006.01)
(52) U.S. Cl. ............................. 701/41; 701/43; 180/446
(58) Field of Classification Search ............. 701/36–41, 701/42, 43; 180/410, 412, 415, 443, 446
See application file for complete search history.

(56) References Cited

U.S. PATENT DOCUMENTS

| 6,577,957 | B2* | 6/2003 | Fujimoto et al. | ............... 702/36 |
| 6,615,152 | B2* | 9/2003 | Fujimoto et al. | ............... 702/94 |

FOREIGN PATENT DOCUMENTS

| JP | 10-226349 | 8/1998 |
| JP | 2004-1643 | 1/2004 |
| JP | 2004-196128 | 7/2004 |
| JP | 2004-210065 | 7/2004 |
| JP | 2006-36052 | 2/2006 |

* cited by examiner

*Primary Examiner*—Richard M. Camby
(74) *Attorney, Agent, or Firm*—Oblon, Spivak, McClelland, Maier & Neustadt, P.C.

(57) ABSTRACT

When it is determined that the torque output from the electric motor abnormally fluctuates or the torque output from the electric motor varies between clockwise and counterclockwise turning operations of the driver's steering wheel, the steering assist control is continued if the vehicle speed v is equal to or lower than the reference speed v0. In this case, the width of the dead band of the steering torque in the assist map used to calculate the target assist torque is increased. Thus, only in a case where the vehicle is moving at a low speed and the driver's steering wheel is operated with a great force, the steering assist torque is produced to alleviate the burden on the driver. In the other cases, the electric motor is stopped to minimize a sense of discomfort in the steering operation.

9 Claims, 7 Drawing Sheets

ELECTRIC POWER STEERING APPARATUS AND METHOD FOR CONTROLLING THE ELECTRIC POWER STEERING APPARATUS

INCORPORATION BY REFERENCE

The disclosure of Japanese Patent Application No. 2006-250217 filed on Sep. 15, 2006, including the specification, drawings and abstract is incorporated herein by reference in its entirety.

BACKGROUND OF THE INVENTION

1. Field of the Invention

The invention relates to an electric power steering apparatus which is provided with an electric motor and which assists the turning operation of a driver's steering wheel performed by a driver. The invention relates also to a method for controlling such electric power steering apparatus.

2. Description of the Related Art

An electric power steering apparatus for a vehicle, which detects the steering torque applied to a steering wheel that is turned by a driver (hereinafter, referred to as a "driver's steering wheel"), and which causes an electric motor to produce the steering assist torque based on the detected steering torque has been used. A controller controls the steering assist torque. The controller calculates the target assist torque based on, for example, the steering torque detected by a steering torque sensor and the vehicle speed detected by a vehicle speed sensor, and controls the amount of electricity passed to the electric motor based on the target assist torque to produce a desired steering assist torque.

With such electric power steering apparatus, if a malfunction occurs in, for example, a sensor, an appropriate steering assist torque is not produced. Therefore, in an electric power steering apparatus described in Japanese Patent Application Publication No. JP-2004-210065 (JP-A-2004-210065), when a malfunction signal from a steering torque sensor is detected, the amount of electricity passed to an electric motor is gradually reduced to stop the assistance to the turning operation of a driver's steering wheel performed by a driver (hereinafter, referred to as the "steering assist").

However, with the electric power steering apparatus described in JP-A-2004-210065, whenever the steering torque sensor malfunctions, the steering assist is stopped. After the steering assist is stopped, the driver is required to produce a greater force to turn the driver's steering wheel, which increases the burden on the driver. If a malfunction caused in the sensor is not a major one, the driver may just feel a slight sense of discomfort in the steering operation. For example, the driver may just feel pulsatile torque fluctuations when turning the driver's steering wheel, or inconsistent steering feel between clockwise and counterclockwise turns of the driver's steering wheel. In such a case, it is not always necessary to stop the steering assist.

SUMMARY OF THE INVENTION

The invention provides an electric power steering apparatus that produces a steering assist torque based on the degree of necessity for the steering assist in order to reduce the burden on a driver even if a malfunction occurs in, for example, a sensor. The invention also provides a method for controlling such electric power steering apparatus.

A first aspect of the invention relates to an electric power steering apparatus which includes a torque sensor that detects the steering torque which is applied by a steering operation of a driver's steering wheel, and an assist control unit that calculates the target assist torque based on at least the detected steering torque, and that executes drive control of an electric motor based on the calculated target assist torque. The electric power steering apparatus drives the electric motor to produce a steering assist torque used to assist the steering operation of the driver's steering wheel. The electric power steering apparatus further includes a vehicle speed detection unit that obtains vehicle-speed information concerning the vehicle speed at which a vehicle is moving; a malfunction determination unit that determines the presence or absence of at least one of an abnormal torque fluctuation, which is a phenomenon in which a torque output from the electric motor abnormally fluctuates, and a torque clockwise/counterclockwise variation, which is a phenomenon in which the torque output from the electric motor varies between clockwise and counterclockwise turning operations of the driver's steering wheel that are performed with the same degree of steering torque; and a malfunction-time control unit that permits the drive control of the electric motor executed by the assist control unit when the vehicle speed is equal to or lower than a predetermined speed, and that prohibits the drive control of the electric motor executed by the assist control unit when the vehicle speed is higher than the predetermined speed, in a case where at least one of the abnormal torque fluctuation and the torque clockwise/counterclockwise variation is detected by the malfunction determination unit.

With the electric power steering apparatus according to the first aspect of the invention, the malfunction determination unit determines the presence or absence of at least one of the abnormal torque fluctuation and the torque clockwise/counterclockwise variation. The abnormal torque fluctuation is the phenomenon in which the torque output from the electric motor pulsates instead of being constant even when the driver turns the driver's steering wheel with a constant steering torque. The torque clockwise/counterclockwise variation is the phenomenon in which the torque output from the electric motor varies between clockwise and counterclockwise turning operations of the driver's steering wheel that are performed with the same degree of steering torque. Such abnormal torque fluctuation or torque clockwise/counterclockwise variation hinders a smooth operation of the driver's steering torque. However, the steering assist need not be stopped.

Accordingly, when the vehicle speed is low and the degree of necessity for the steering assist is high, the malfunction-time control unit drives the electric motor using the assist control unit to produce the steering assist torque. On the other hand, when the vehicle speed is high and the degree of necessity for the steering assist is low, the drive control of the electric motor using the assist control unit is prohibited. Namely, with the electric power steering apparatus according to the first aspect of the invention, when the abnormal torque fluctuation or the torque clockwise/counterclockwise variation has occurred, the electric motor is driven by the assist control unit to produce the steering assist torque only in the case where the necessity for the steering assist is high. In the other cases, the steering assist is prohibited to minimize a sense of discomfort in the steering operation. As a result, it is possible to utilize the steering assist function of the electric power steering apparatus as much as possible to alleviate the burden on the driver while minimizing a sense of discomfort in the steering operation.

The malfunction determination unit may determine the presence or absence of at least one of the abnormal torque fluctuation and the toque clockwise/counterclockwise variation by determining whether a malfunction, which will be a factor for the abnormal torque fluctuation or the torque clockwise/counterclockwise variation, has occurred.

The assist control unit may store the normal-time calculation data based on which the target assist torque is set to a higher value as the detected steering torque is higher, and the malfunction-time calculation data that has a dead band of the steering torque, where the target assist torque is set to zero. The width of the dead band in the malfunction-time calculation data is greater than the width of a dead band in the normal-time calculation data. When neither the abnormal torque fluctuation nor the torque clockwise/counterclockwise variation is detected by the malfunction determination unit, the assist control unit may calculate the target assist torque based on the normal-time calculation data. On the other hand, when at least one of the abnormal torque fluctuation and the torque clockwise/counterclockwise variation is detected by the malfunction determination unit and the drive control of the electric motor is permitted, the assist control unit may calculate the target assist torque based on the malfunction-time calculation data.

With the electric power steering apparatus configured as described above, the target assist torque is set to a higher value by the assist control unit, as the steering torque applied by the driver is higher. The calculation data used to calculate the target assist torque is changed between when at least one of the abnormal torque fluctuation and the torque clockwise/counterclockwise variation is detected by the malfunction determination unit and when neither the abnormal toque fluctuation nor the torque clockwise/counterclockwise variation is detected by the malfunction determination unit. When neither the abnormal toque fluctuation nor the torque clockwise/counterclockwise variation is detected by the malfunction determination unit, the target assist torque is calculated based on the normal-time calculation data. On the other hand, when at least one of the abnormal torque fluctuation and the torque clockwise/counterclockwise variation is detected by the malfunction determination unit, the target assist torque is calculated based on the malfunction-time calculation data. The width of the dead band of the steering torque, in which the target assist torque is set to zero, in the malfunction-time calculation data is greater than that in the normal-time calculation data.

In the steering torque range in which the magnitude of the steering torque detected by the torque sensor is equal to or lower than a predetermined value, the magnitude of the steering torque is regarded as zero and the target assist torque is set to zero. The steering torque range in which the magnitude of the steering torque is equal to or lower than the predetermined value is referred to as the dead band. The width of the dead band in the malfunction-time calculation data is set to be greater than the width of the dead band in the normal-time calculation data. Accordingly, when a malfunction is detected, if the driver performs the steering operation with a weak force, the detected steering torque is prone to be within the dead band. In this case, the target assist torque is set to zero, and issuance of a command to drive the electric motor is stopped. On the other hand, if the driver performs the steering operation with a strong force, the detected steering torque is out of the dead band, a predetermined target assist torque is set, and drive control of the electric motor is executed.

With the electric power steering apparatus configured as described above, when the abnormal torque fluctuation or the torque clockwise/counterclockwise variation is detected, the steering assist is provided by the electric motor to the operation of the driver's steering wheel, which is intentionally performed with a strong force by the driver. On the other hand, provision of the steering assist by the electric motor to the operation of the driver's steering wheel, which is unintentionally performed by the driver with a weak force, is prohibited. Accordingly, when the degree of necessity for the steering assist is high, the electric motor is driven to alleviate the burden on the driver. On the other hand, when the degree of necessity for the steering assist is low, the operation of the electric motor is stopped to minimize a sense of discomfort in the steering operation. The calculation data used to calculate the target assist torque may be stored in various forms such as a data map and an operational expression.

The malfunction determination unit may determine the presence or absence of the abnormal torque fluctuation or the torque clockwise/counterclockwise variation by determining whether a malfunction has occurred in the torque sensor.

In some cases, a drift occurs in the signal output from the torque sensor, namely, the detected steering torque deviates from the actual steering torque. That is, a steering torque, which will be produced if the driver's steering wheel is turned by a greater amount, is erroneously detected when the driver's steering wheel is turned in one of the clockwise direction and the counterclockwise direction, and a steering torque, which will be produced if the driver's steering wheel is turned by a less amount, is erroneously detected when the driver's steering wheel is turned in the other of the clockwise direction and the counterclockwise direction. In such a case, the torque clockwise/counterclockwise variation occurs. Accordingly, the presence or absence of the torque clockwise/counterclockwise variation is determined by determining whether a drift has occurred in the signal output from the torque sensor.

When the torque sensor that detects the steering torque by detecting the rotational angle using a resolver sensor is used, the rotational angle is detected based on the relationship between a sine-wave signal and a cosine-wave signal. If abnormal amplitude of the sine-wave signal or the cosine-wave signal has occurred, the linearity of the rotational angle detection value is lost, and the detected rotational angle pulsates with respect to the actual rotational angle. As a result, the detected torque also looses its linearity and pulsates, and the output from the electric motor also pulsates. Accordingly, the presence or absence of the abnormal toque fluctuation is determined by determining the presence or absence of abnormal amplitude of the signal output from the resolver sensor. With the electric power steering apparatus configured as described above, the presence or absence of the abnormal torque fluctuation or the torque clockwise/counterclockwise variation is determined by determining whether a malfunction has occurred in the torque sensor.

The malfunction determination unit may determine the presence or absence of the abnormal torque fluctuation by determining whether a malfunction has occurred in a power supply line through which electricity is supplied to the electric motor.

For example, if one of the power supply lines that leads to the three-phase motor is broken, the abnormal torque fluctuation occurs, that is, the torque output from the motor pulsates although the electric motor is able to be driven. Accordingly, with the electric power steering apparatus configured as described above, the presence or absence of the abnormal torque fluctuation is determined by determining whether a malfunction has occurred in the power supply line.

The assist control unit may be provided with a current sensor that detects a current value of an electric current passed to the electric motor, and execute a feedback control such that the current value becomes equal to a target current value that corresponds to the target assist torque. The malfunction determination unit may determine the presence or absence of the abnormal torque fluctuation by determining whether a malfunction has occurred in the current sensor.

With the electric power steering apparatus configured as described above, the current value of the electric current passed to the electric motor is detected, and the feedback control is executed such that the current value becomes equal to the target current value that corresponds to the target assist torque. In a configuration where such current feedback control is executed, in the event of a malfunction that the balance among the phases of the current sensor that detects the current value of the electric current passed to the three-phase motor is lost and the detected current value of one of the phases deviates from the actual current value, namely, in the event of a malfunction that the detected current value of one of the phases is higher or lower than the actual current value by a predetermined amount, the output from the electric motor pulsates in accordance with the motor rotational angle. Therefore, with the electric power steering apparatus configured as described above, the presence or absence of the abnormal toque fluctuation is determined by determining whether a malfunction has occurred in the current sensor. For example, in the case of the three-phase motor, if the motor is operating properly, the total sum of the current values of the U-phase, the V-phase and the W-phase is zero. If the total sum is not zero, it is determined that a malfunction has occurred in the current sensor, and therefore, it is determined that the abnormal torque fluctuation has occurred.

The assist control unit may calculate the target assist torque based on the malfunction-time calculation data, when it is determined that a malfunction has occurred in the current sensor and the drive control of the electric motor is permitted. The assist control unit may execute the drive control of the electric motor based on the calculated target assist torque. The assist control unit may stop the operation of a drive unit used to drive the electric motor, when the detected steering torque is within the dead band set in the malfunction-time calculation data.

With the electric power steering apparatus configured as described above, the target assist torque is calculated based on the malfunction-time calculation data, when it is determined that a malfunction has occurred in the current sensor and the drive control of the electric motor is permitted. However, even when the target assist torque is set to zero, if a malfunction has occurred in the current sensor, the electric motor may be erroneously driven by a feedback control unit. Accordingly, if a malfunction has occurred in the current sensor, the operation of the drive unit used to drive the electric motor is stopped when the detected steering torque is within the dead band set in the malfunction-time calculation data. For example, in a configuration in which the PWM control is executed on the electric motor through an inverter circuit, an issuance of the PWM control signal is stopped. Thus, when the target assist torque is set to zero, the electric motor is reliably stopped.

The malfunction determination unit may determine the presence or absence of the abnormal torque fluctuation by determining whether a malfunction has occurred in the drive unit used to drive the electric motor.

In the configuration where the PWM control is executed on the three-phase motor through the inverter circuit, if a malfunction has occurred in one of the U-phase, the V-phase and the W-phase of a motor drive unit (the inverter circuit or a PWM control circuit), the abnormal torque fluctuation occurs, that is, the torque output from the motor pulsates although the electric motor is able to be driven. Accordingly, with the electric power steering apparatus configured as described above, the presence or absence of the abnormal torque fluctuation is determined by determining whether a malfunction has occurred in the motor drive unit.

The assist control unit may calculate the target assist torque based on the malfunction-time calculation data, when it is determined that a malfunction has occurred in the drive unit used to drive the electric motor and the drive control of the electric motor is permitted. The assist control unit may execute the drive control of the electric motor based on the calculated target assist torque. The assist control unit may shut off a supply of electricity to the electric motor through the power supply line, when the detected steering torque is within the dead band set in the malfunction-time calculation data.

With the electric power steering apparatus configured as described above, when it is determined that a malfunction has occurred in the drive unit and the drive control of the electric motor is permitted, the target assist torque is set based on the malfunction-time calculation data. However, even when the target assist torque is set to zero, if a malfunction has occurred in the motor drive unit, the electric motor may be erroneously driven. Accordingly, with the electric power steering apparatus configured as described above, if a malfunction has occurred in the motor drive unit, the supply of electricity to the electric motor through the power supply line is shut off when the detected steering torque is within the dead band set in the malfunction-time calculation data. For example, a relay may be provided to the power supply line that leads to the electric motor, and electric power supply to the electric motor may be shut off by turning off the relay. Thus, when the target assist torque is set to zero, the electric motor is reliably stopped.

A second aspect of the invention relates to a method for controlling an electric power steering apparatus which includes a torque sensor that detects the steering torque which is applied by a steering operation of a driver's steering wheel, and an assist control unit that calculates the target assist torque based on at least the detected steering torque and that executes drive control of an electric motor based on the calculated target assist torque, and which drives the electric motor to produce a steering assist torque used to assist the steering operation of the driver's steering wheel. According to the control method, vehicle-speed information concerning the vehicle speed at which a vehicle is moving is obtained; and the presence or absence of at least one of an abnormal torque fluctuation and a torque clockwise/counterclockwise variation is determined. The abnormal torque fluctuation is a phenomenon in which a torque output from the electric motor abnormally fluctuates. The toque clockwise/counterclockwise variation is a phenomenon in which the torque output from the electric motor varies between clockwise and counterclockwise turning operations of the driver's steering wheel that are performed with the same degree of steering torque. In a case where at least one of the abnormal torque fluctuation and the torque clockwise/counterclockwise variation is detected by the malfunction determination unit, the drive control of the electric motor executed by the assist control unit is permitted when the vehicle speed is equal to or lower than a predetermined speed. On the other hand, when the vehicle speed is higher than the predetermined speed, the drive control of the electric motor executed by the assist control unit is prohibited.

BRIEF DESCRIPTION OF THE DRAWINGS

The foregoing and further objects, features and advantages of the invention will become apparent from the following description of an example embodiment with reference to the accompanying drawings, wherein the same or corresponding portions will be denoted by the same reference numerals and wherein.

DETAILED DESCRIPTION OF THE EXAMPLE EMBODIMENT

Figure 1:
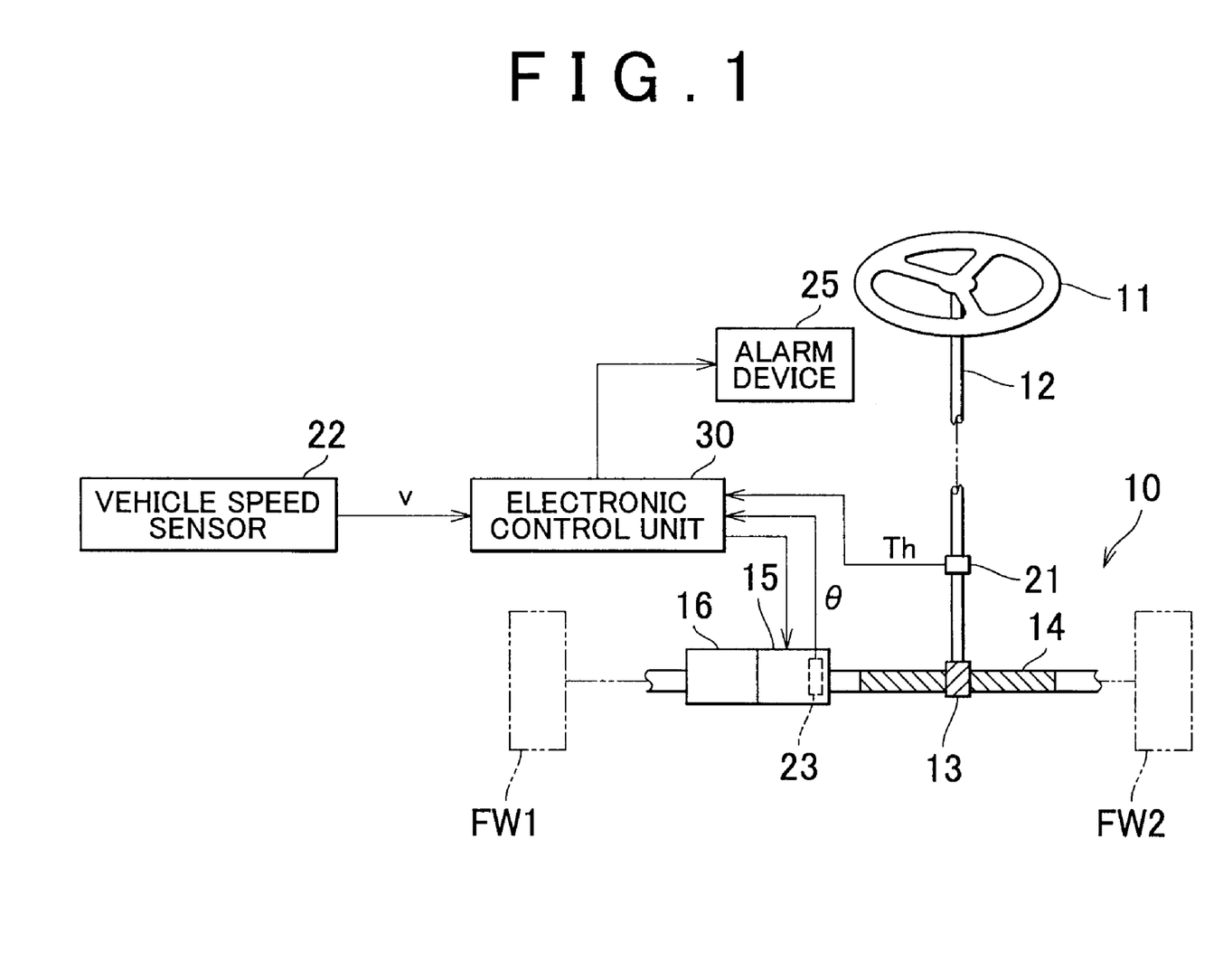
FIG. 1 is a view schematically showing an electric power steering apparatus for a vehicle according to an embodiment of the invention.

Hereafter, an embodiment of the invention will be described with reference to the accompanying drawings. FIG. 1 is the view schematically showing an electric power steering apparatus for a vehicle according to the embodiment of the invention.

The electric power steering apparatus for a vehicle mainly includes a steering mechanism 10 that steers steering wheels of a vehicle in response to the turning operation of a driver's steering wheel 11; an electric motor 15 that is fitted to the steering mechanism 10 and that produces a steering assist torque; and an electronic control unit 30 that controls the operation of the electric motor 15 in response to the turning operation of the driver's steering wheel 11.

The steering mechanism 10 steers a left front wheel FW1 and a right front wheel FW2 in response to the turning operation of the driver's steering wheel 11, and includes a steering shaft 12 that is connected, at its upper end, to the driver's steering wheel 11 so as to rotate together with the driver's steering wheel 11. A pinion gear 13 is connected to the lower end of the steering shaft 12 so as to rotate together with the steering shaft 12. The pinion gear 13 meshes with rack teeth formed in a rack bar 14, whereby a rack-and-pinion mechanism is formed. The left front wheel FW1 and the right front wheel FW2 are connected to the respective ends of the rack bar 14 via tie rods (not shown) and knuckle arms (not shown) so that the front wheels FW1 and 2 can be steered. The left front wheel FW1 and the right front wheel FW2 are steered in the clockwise direction or in the counterclockwise direction in accordance with the movement of the rack bar 14 in its axial direction, which is caused due to the rotation of the steering shaft 12 about its axis. Accordingly, the driver's steering wheel 11, the steering shaft 12, the rack-and-pinion mechanism 13, 14, the tie rods, the knuckle arms, etc. constitute the steering mechanism 10.

The electric motor 15 that produces a steering assist torque is fitted to the rack bar 14. In the embodiment of the invention, the electric motor 15 is formed of a brushless motor that is a three-phase permanent magnet motor. The rotating shaft of the electric motor 15 is connected to the rack bar 14 via a ball screw mechanism 16 so that power is transferred from the electric motor 15 to the rack bar 14. The rotation of the rotating shaft of the electric motor 15 assists the steering operation of the left front wheel FW1 and the right front wheel FW2. The ball screw mechanism 16 serves as a speed reducer and a rotational-linear movement converter. The ball screw mechanism 16 reduces the speed of rotation transferred from the electric motor 15, converts the rotational movement of the electric motor 15 to the linear movement, and transfers the linear movement to the rack bar 14. Instead of being fitted to the rack bar 14, the electric motor 15 may be fitted to the steering shaft 12. Then, the rotation of the electric motor 15 may be transferred to the steering shaft 12 via a speed reducer to drive the steering shaft 12 so that the steering shaft 12 rotates about its axis.

A steering torque sensor 21 is fitted to the steering shaft 12. The steering torque sensor 21 outputs a signal indicating the steering torque applied to the steering shaft 12 in response to the turning operation of the driver's steering wheel 11. The value of the steering torque indicated by the signal output from the steering torque sensor 21 will be referred to as the "steering torque Th". The direction in which the driver's steering wheel 11 is turned is identified based on whether the steering torque Th takes a positive value or a negative value. According to the embodiment of the invention, the steering torque Th takes a positive value when the driver's steering wheel 11 is turned clockwise. Conversely, the steering torque Th takes a negative value when the driver's steering wheel 11 is turned counterclockwise. Accordingly, the magnitude of the steering torque Th signifies the magnitude of the absolute value of the steering torque Th.

Figure 8:
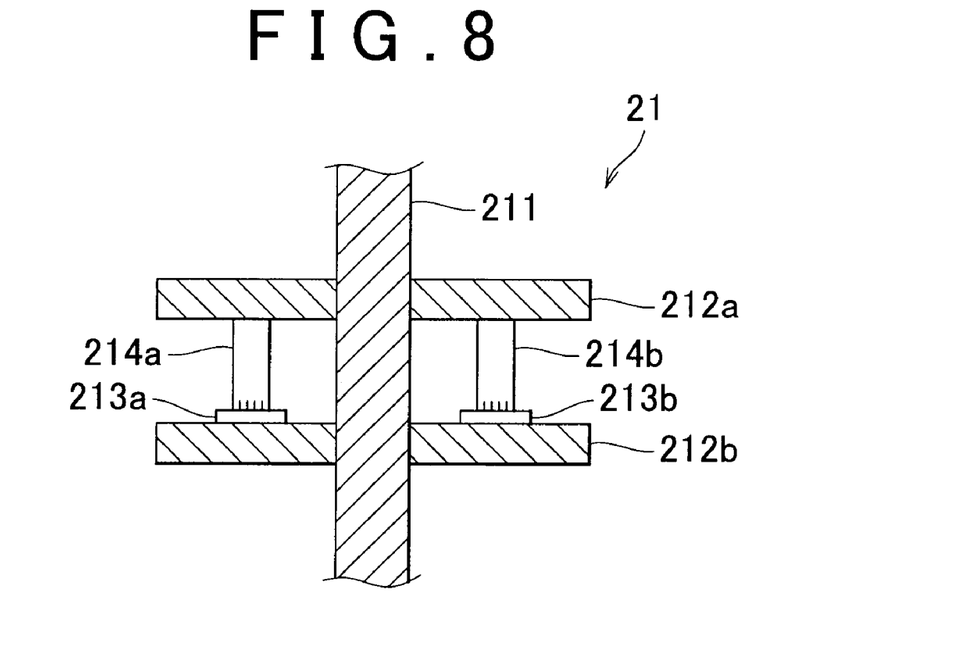
FIG. 8 is a side view for describing the operating principles of a steering torque sensor.
Figure 9:
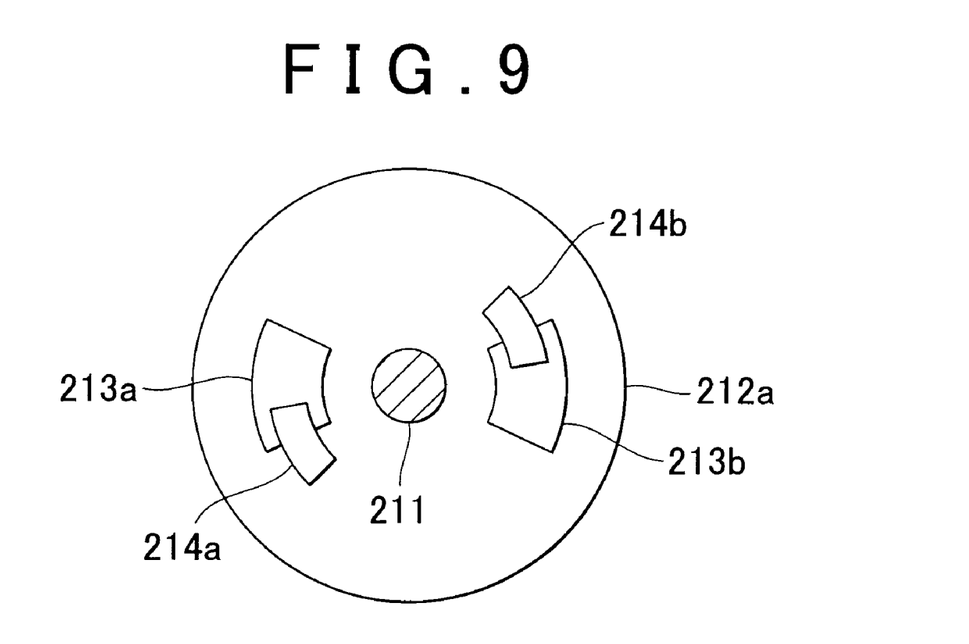
FIG. 9 is a plan view for describing the operating principles of the steering torque sensor.

Used as the steering torque sensor 21 is a sensor that changes the electric resistance or the magnetic resistance in accordance with the torsional angle of a torsion bar provided at the middle portion of the steering shaft 12, and that outputs a voltage signal based on a change in the electric resistance or the magnetic resistance. The description below will be provided on the assumption that an electric resistance variable torque sensor is used as the steering torque sensor 21. As shown in FIGS. 8 and 9, the steering torque sensor 21 is provided with two circular discs 212a and 212b that are fixed to a torsion bar 211 so as to face each other with a predetermined distance kept therebetween. The circular disc 212b is provided with two resistance plates 213a and 213b. The circular disc 212a is provided with two brushes 214a and 214b that are able to slide on the resistance plate 213a and 213b, respectively. The steering torque sensor 21 changes the positions of the brushes 214a and 214b on the resistance plates 213a and 213b, respectively, based on a change in the relative angle position between the two circular plates 212a and 212b, which is caused in response to the torsion of the torsion bar 211. The steering torque sensor 21 thus causes the resistance plates 213a and 213b to function as the variable resistances. The steering torque sensor 21 then outputs voltage signals indicating the resistance values. Accordingly, the steering torque sensor 21 outputs two separate voltage signals based on the changes in the resistances due to the movements of the brushes 214a and 214b on the resistance plates 213a and 213b, respectively.

One of the two voltage signals is used as a detection signal indicating the steering torque Th, and the other voltage signal is used as a signal Thc for determining whether a malfunction has occurred in a sensor. If the steering torque sensor 21 is operating properly, the two voltage signals indicate the same value. On the other hand, if a malfunction has occurred in the steering torque sensor 21, the two voltage signals indicate different values. Accordingly, whether a malfunction has occurred in the steering torque sensor 21 is determined by comparing the values indicated by the two voltage signals with each other.

Figure 10:
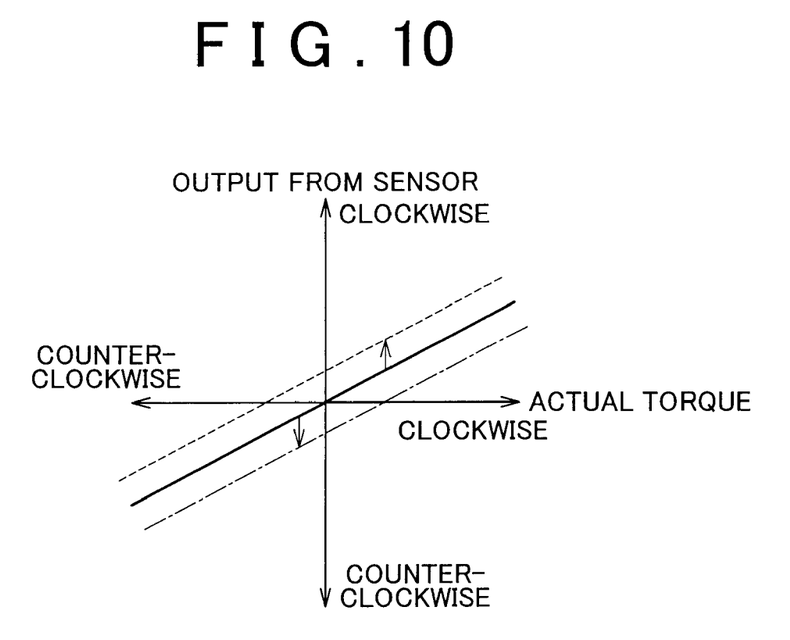
FIG. 10 is a graph showing the detection characteristics of the steering torque sensor.

As shown in FIG. 10, the lines, which show the steering torque Th indicated by the detection signals from the steering torque sensor 21 that is malfunctioning, drift from the origin point. Namely, the detected steering torque deviates from the actual steering torque (indicated by the lateral axis in FIG. 10). A steering torque, which will be produced if the driver's steering wheel 11 is turned by a greater amount, is erroneously detected when the driver's steering wheel 11 is turned in one of the clockwise direction and the counterclockwise direction. A steering torque, which will be produced if the driver's steering wheel 11 is turned by a less amount, is erroneously detected when the driver's steering wheel 11 is turned in the other of the clockwise direction and the counterclockwise direction. This may cause a torque clockwise/counterclockwise variation, which is a phenomenon in which the torque output from the electric motor 15 varies between clockwise and counterclockwise turning operations of the driver's steering wheel 11 that are performed with the same degree of steering torque. In FIG. 10, the solid line indicates the torque detection characteristics (the relationship between the actual steering torque and the steering torque detected by the sensor) in the normal state; the dashed line indicates the torque detection characteristics in the malfunction state in which a steering torque, which will be produced if the driver's steering wheel 11 is turned by a greater amount, is erroneously detected when the driver's steering wheel 11 is turned clockwise; and the alternate long and short dashed line indicates the torque detection characteristics in the malfunction state in which a steering torque, which will be produced if the driver's steering wheel 11 is turned by a greater amount, is erroneously detected when the driver's steering wheel 11 is turned counterclockwise.

A rotational angle sensor 23 is arranged in the electric motor 15. The rotational angle sensor 23 is embedded in the electric motor 15, and outputs a detection signal indicating the rotational angle position of a rotor of the electric motor 15. The detection signal from the rotational angle sensor 23 is used to calculate the rotational angle and the rotational angular speed of the electric motor 15. The rotational angle of the electric motor 15 is proportional to the steering angle of the driver's steering wheel 11. Accordingly, the rotational angle is used also as the steering angle of the driver's steering wheel 11. Also, the rotational angular speed of the electric motor 15 is proportional to the steering angular speed of the driver's steering wheel 11. Accordingly, the rotational angular speed of the electric motor 15 is used also as the steering angular speed of the driver's steering wheel 11.

Hereafter, the value of the steering angle of the driver's steering wheel 11, which is detected based on a signal output from the rotational angle sensor 23, will be referred to as the steering angle θ; and the value of the steering angular speed which is obtained by differentiating the steering angle θ with respect to time will be referred to as the steering angular speed ω. When being a positive value, the steering angle θ indicates the steering angle of the driver's steering wheel 11 with respect to the neutral position in the clockwise direction. When being a negative value, the steering angle θ indicates the steering angle of the driver's steering wheel 11 with respect to the neutral position in the counterclockwise direction. In the embodiment of the invention, the neutral position of the driver's steering wheel 11 is indicated by "0", a steering angle with respect to the neutral position in the clockwise direction is indicated by a positive value, and a steering angle with respect to the neutral position in the counterclockwise direction is indicated by a negative value.

Next, the electronic control unit 30 that controls the operation of the electric motor 15 will be described. The electronic control unit 30 may be regarded as an assist control unit. The electronic control unit 30 is formed mainly of a microcomputer including a CPU, ROM, RAM, etc. and includes a drive circuit for the electric motor 15. The electronic control unit 30 receives detection signals from the steering torque sensor 21, the rotational angle sensor 23, and a vehicle speed sensor 22 that are all connected to the electronic control unit 30. The vehicle speed sensor 22 outputs a vehicle speed signal that indicates the speed v at which the vehicle is moving. The electronic control unit 30 is also connected to an alarm device 25, for example, a warning lamp that notifies the driver of occurrence of a malfunction.

Figure 2:
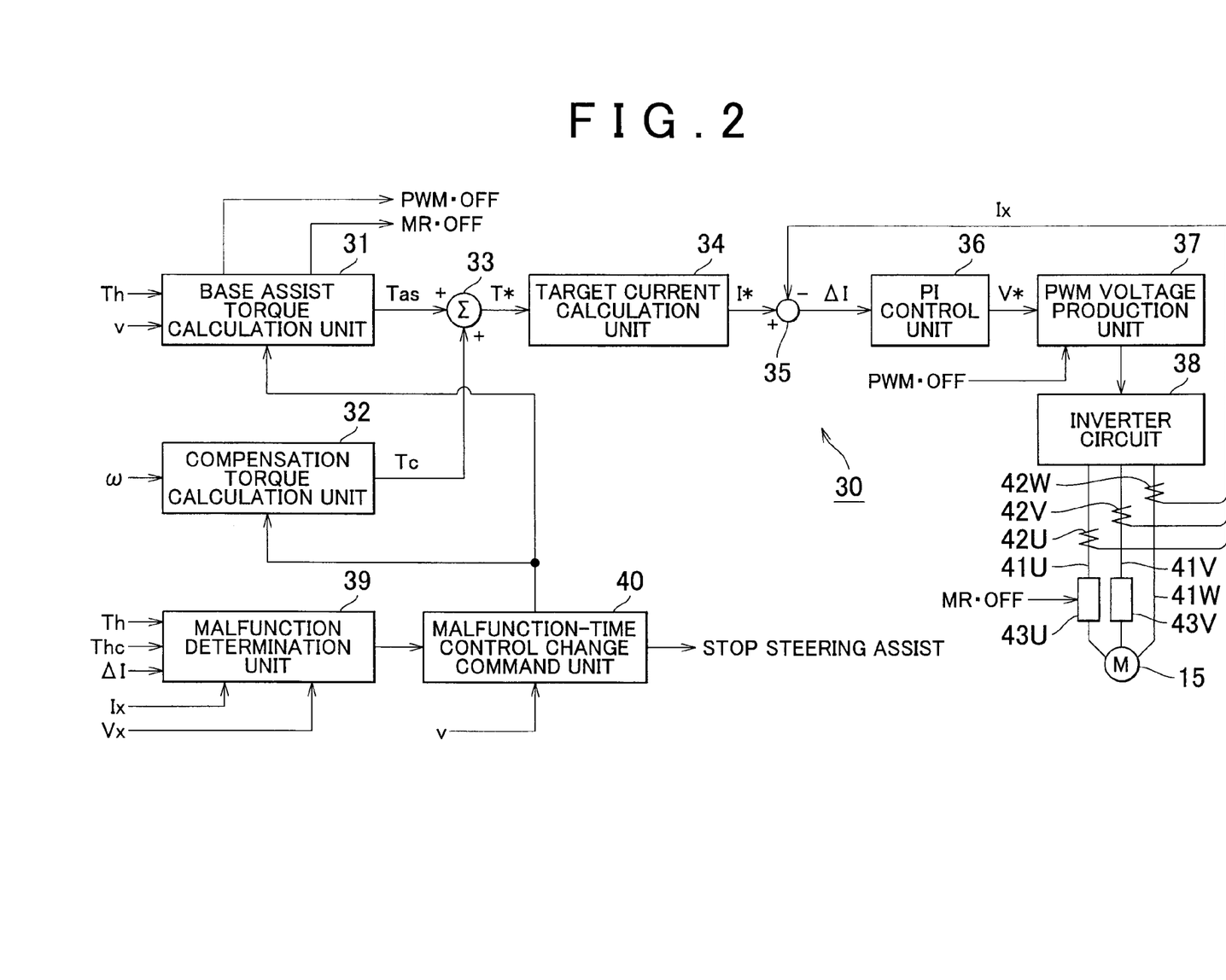
FIG. 2 is a functional block diagram showing the functions of an electronic control unit according to the embodiment of the invention.

Next, the electronic control unit 30 will be described in detail. FIG. 2 is the block diagram showing the entirety of the electronic control unit 30 including the functional blocks of the microcomputer. The functions shown in the functional blocks are implemented by executing the programs. The electronic control unit 30 includes a base assist torque calculation unit 31 that calculates the base assist torque, and a compensation torque calculation unit 32 that calculates the compensation torque.

The base assist torque calculation unit 31 receives signals indicating the steering torque Th and the vehicle speed v, and calculates the base assist torque Tas based on the steering torque Th and the vehicle speed v. The base assist torque Tas is calculated using the assist map. Two assist maps, namely, the normal-time assist map that is used when a malfunction determination unit 39, described in detail later, determines that there is no malfunction, and the malfunction-time assist map that is used when the malfunction determination unit 39 determines that a malfunction has occurred are prepared. These assist maps are stored in the ROM of the microcomputer.

Figure 4:
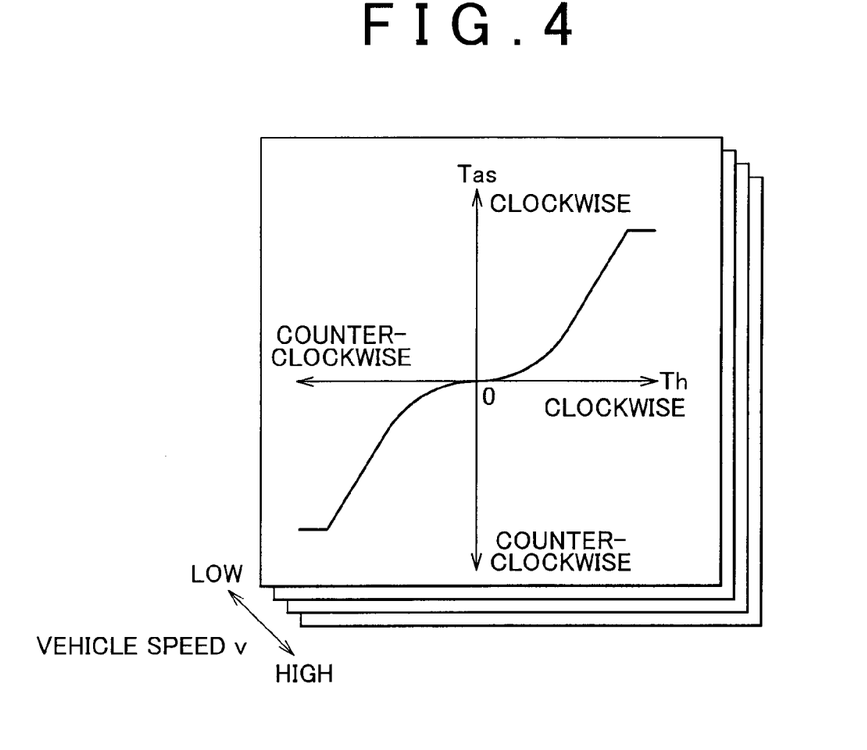
FIG. 4 is an illustration diagram showing the normal-time assist map used to calculate the base assist torque in the normal state.
Figure 5:
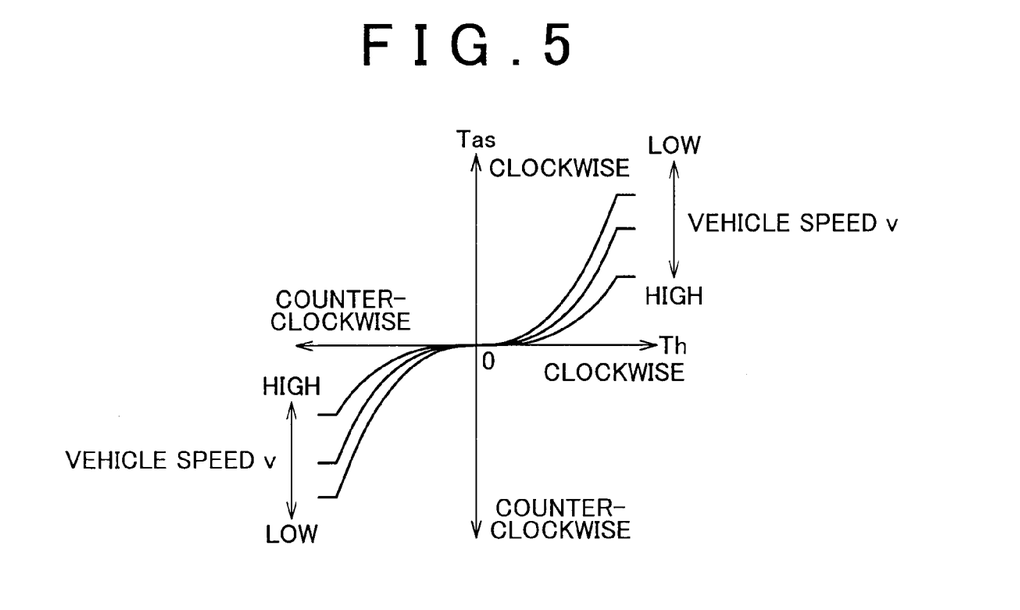
FIG. 5 is a graph showing the relationship between the steering torque and the base assist torque, which varies depending on the vehicle speed.

As shown in FIG. 4, the normal-time assist map defines multiple relationships between the base assist torque Tas and the steering torque Th for multiple vehicle speeds v. According to the normal-time assist map, the base assist torque Tas is set to increase as the steering torque Th increases. As shown in FIG. 5, the relationship between the steering torque Th and the base assist torque Tas is set such that, as the vehicle speed v increases, the base assist torque Tas wholly decreases, namely, at a given steering torque Th, the base assist torque Tas decreases as the vehicle speed v increases.

Figure 6:
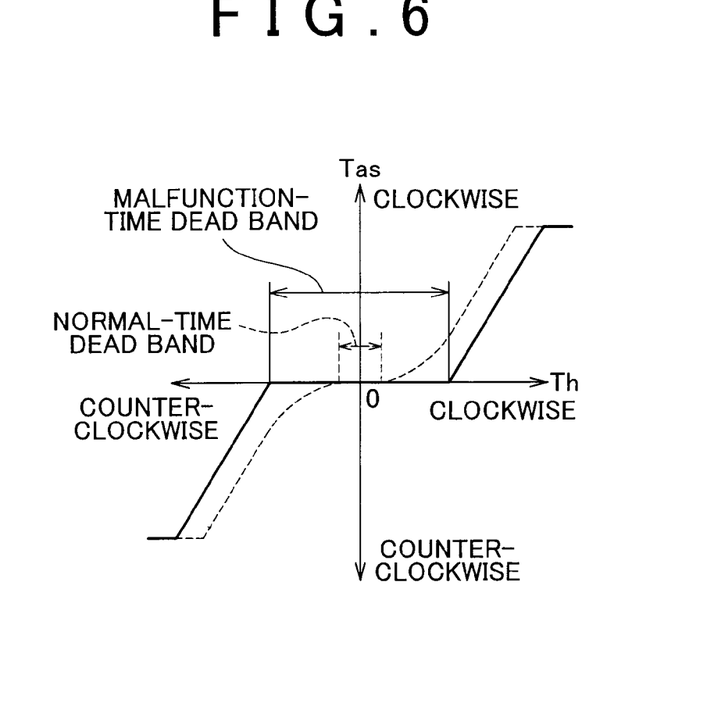
FIG. 6 is an illustration diagram showing the malfunction-time assist map used to calculate the base assist torque when a malfunction has occurred.

As shown in FIG. 6, the width of the dead band of the steering torque Th in the malfunction-time assist map is greater than that in the normal-time assist map. In the dead band, the base assist torque Tas is set to zero. In the normal-time assist map, the multiple relationships between the base assist torque Tas and the steering torque Th are set for the multiple vehicle speeds v. In contrast, the malfunction-time assist map is not provided with multiple patterns of assist characteristics depending on the vehicle speed v. However, the assist characteristics may be changed based on the vehicle speed v.

The normal-time assist map according to the embodiment of the invention may be regarded as normal-time calculation data. The malfunction-time assist map according to the embodiment of the invention may be regarded as malfunction-time calculation data. Instead of using such assist map, a function that defines the base assist torque Tas that changes in accordance with the steering torque Th may be stored, and the base assist torque Tas may be calculated using the function.

Figure 7:
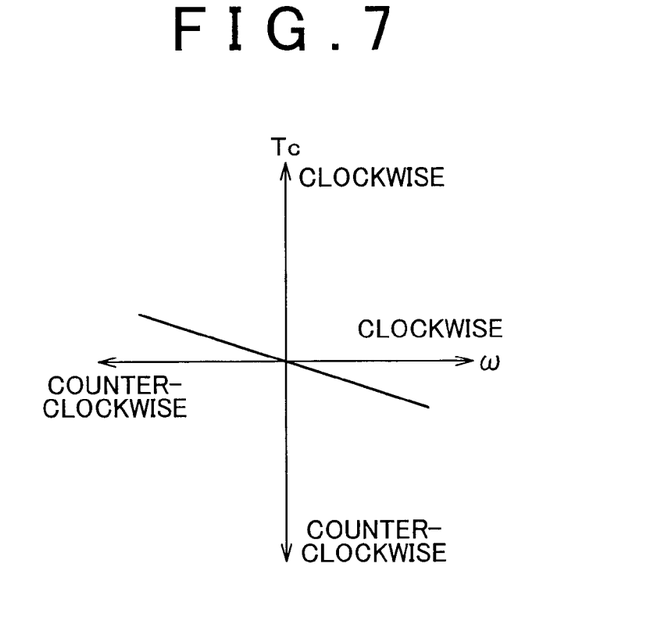
FIG. 7 is an illustration diagram showing the compensation torque map used to calculate the compensation torque.

The compensation torque calculation unit 32 receives a signal indicating the steering angular speed ω of the driver's steering wheel 11, which is achieved by the operation performed by the driver, and calculates the compensation torque Tc based on the steering angular speed ω. The compensation torque Tc is used to give a somewhat heavy feel to the operation of the driver's steering wheel 11 performed by the driver. The compensation torque Tc is calculated using the compensation torque map shown in FIG. 7. As can be seen from the compensation torque map, the compensation torque, which is applied in the direction opposite to the direction in which the driver's steering wheel 11 is turned, is set to increase as the steering angular speed ω increases. The compensation torque is not limited to the torque that is used to give a somewhat heavy feel to the operation of the driver's steering wheel 11. For example, a return torque that is applied to return the driver's steering wheel 11 to the neutral position based on the steering angle θ, or a cooperative control torque that is produced according to a command from another control system may be used as the compensation torque. Alternatively, the configuration may be such that the compensation torque is not used.

The electronic control unit 30 includes a target assist torque calculation unit 33. The target assist torque calculation unit 33 receives signals indicating the base assist torque Tas calculated by the base assist torque calculation unit 31 and the compensation torque Tc calculated by the compensation torque calculation unit 32. The target assist torque calculation unit 33 then calculates the target assist torque T*(=Tas+Tc) by adding the base assist torque Tas and the compensation torque Tc together. Then, the electric motor 15 is controlled by the following units based on the target assist torque T*.

The electronic control unit 30 includes a target current calculation unit 34, a current deviation calculation unit 35, a proportional-integral control unit (PI control unit) 36, a PWM voltage production unit 37, and an inverter circuit 38. The target current calculation unit 34 receives a signal indicating the target assist torque T* calculated by the target assist torque calculation unit 33, and calculates the target current I* proportional to the target assist torque T*. The current deviation calculation unit 35 receives signals indicating the target current I* calculated by the target current calculation unit 34 and the actual current Ix that is passed to the electric motor 15, and calculates the deviation ΔI (=I*−Ix) of the actual current Ix from the target current I*. Current sensors 42U, 42V, and 42W are provided on power supply lines 41U, 41V and 41W that lead to the electric motor 15, and detect the currents (IUx, IVx, IWx) to be passed through the U-phase, the V-phase and the W-phase of the electric motor 15, respectively. Motor relays 43U and 43V are provided on the predetermined two power supply lines (41U and 41V, in the embodiment of the invention) from among the three power supply lines 41U, 41V and 41W. The motor relays 43U and 43V permit or block supply of electricity to the electric motor 15.

The electronic control unit 30 controls the rotation of the electric motor 15 by executing vector control indicated by a two-phase rotating flux coordinate system (hereinafter, referred to as a "d-q coordinate system") where the direction in which the electric motor 15 rotates is used as the q-axis and the direction perpendicular to the direction in which the electric motor 15 rotates is used as the d-axis. Therefore, although not shown in FIG. 2, the electronic control unit 30 includes a three-phase/two-phase coordinate conversion unit that converts the three-phase detection currents (IUx, IVx, IWx) into the d-q coordinate system. The three-phase/two-phase coordinate conversion unit converts the detection currents (IUx, IVx, IWx) into the detection currents (Idx, Iqx). The target current calculation unit 34 also calculates the target currents (Id*, Iq*) in the d-q coordinate system. Accordingly, the current deviation calculation unit 35 calculates the deviations (Id*−Idx, Iq*−Iqx) in the d-q coordinate system.

Because the above-mentioned current control using the d-q coordinate system is not a distinctive feature of the embodiment of the invention, the target currents are collectively referred to as "I*", and the detection currents are collectively referred to as "Ix" in the specification, as shown in FIG. 2.

A signal indicating the deviation ΔI calculated by the current deviation calculation unit 35 is transmitted to the proportional-integral control unit (PI control unit) 36. The proportional-integral control unit 36 calculates the target voltage V* based on the deviation ΔI so that the actual current Ix becomes equal to the target current I*, namely, the deviation ΔI becomes zero.

A signal indicating the target voltage V* calculated by the proportional-integral control unit 36 is transmitted to the PWM voltage production unit 37. In this case, the target voltage V* calculated by the proportional-integral control unit 36 is converted into a three-phase target voltage by a two-phase/three-phase coordinate conversion unit (not shown), and a signal indicating the three-phase target voltage is transmitted to the PWM voltage production unit 37. The PWM voltage production unit 37 transmits a signal indicating the three-phase PWM control voltage corresponding to the target voltage V* to the inverter circuit 38. The inverter circuit 38 produces a three-phase exciting voltage based on the PWM control voltage signal, and applies the three-phase exciting voltage to the electric motor 15 through the three-phase power supply lines 41U, 41V and 41W. Thus, the left front wheel FW1 and the right front wheel FW2 are steered with assistance from the drive power produced by the electric motor 15.

The electronic control unit 30 further includes the malfunction determination unit 39. The malfunction determination unit 39 determines whether a malfunction that will be a factor responsible for abnormal torque fluctuations or a torque clockwise/counterclockwise variation has occurred. Namely, the malfunction determination unit 39 determines whether a drift has occurred in the output from the steering torque sensor 21, that is, whether the value detected by the steering torque sensor 21 deviates from the actual value; whether a malfunction has occurred in at least one of the current sensors 42U, 42V and 42W; whether a malfunction has occurred in a motor drive system that includes the PWM voltage production unit 37 and the inverter circuit 38; and whether at least one of the power supply lines 41U, 41V and 41W that lead to the electric motor 15 has been broken.

If the value detected by the steering torque sensor 21 deviates from the actual value, the detection torque Th deviates from the actual steering torque. That is, a steering torque, which will be produced if the driver's steering wheel 11 is turned by a greater amount, is erroneously detected when the driver's steering wheel 11 is turned in one of the clockwise direction and the counter clockwise direction, and a steering torque, which will be produced if the driver's steering wheel 11 is turned by a less amount, is erroneously detected when the driver's steering wheel 11 is turned in the other of the clockwise direction and the counterclockwise direction. Accordingly, even if the same operation force is used to turn the driver's steering wheel 11 in clockwise and counterclockwise, the magnitude of the supplied steering assist torque varies between when the driver's steering wheel 11 is turned clockwise and when it is turned counterclockwise. As a result, the operation force required of the driver varies depending on the direction in which the driver's steering wheel 11 is turned. Accordingly, the driver may feel a sense of discomfort in the turning operation of the driver's steering wheel 11. Therefore, the malfunction determination unit 39 compares the signals Th and Thc transmitted from the steering torque sensor 21 with each other, and determines that a malfunction has occurred in the steering torque sensor 21 if the deviation between the voltage values indicated by these signals Th and Thc is equal to or greater than the reference value.

In any one of the three current sensors 42U, 42V and 42W, a deviation of the offset value may be caused, and a drift may occur in the output therefrom, that is, the detected value may deviate from the actual value. In such a case, the current sensor that is malfunctioning outputs a detection signal indicating a current value that is higher or lower than the actual current value. As a result, a balance in the detection current among the phases is lost. Accordingly, when the three-phase current is controlled in a feedback manner based on the electric angle of the electric motor 15, the output from the electric motor 15 may pulsate. The malfunction determination unit 39 determines that a malfunction has occurred in at least one of the current sensors 42U, 42V and 42W when the total sum of the three-phase currents IUx, IVx, and IWx detected by the current sensors 42U, 42V and 42W, respectively, is not zero (IUx+IVx+IWx≠0). In FIG. 2, the three-phase currents IUx, IVx and IWx are collectively referred to as Ix.

If a malfunction has occurred in one of the three-phases in the motor drive system, for example, in the PWM voltage production unit 37 or the inverter circuit 38 (for example, an abnormal output from the U-phase), the torque output from the electric motor 15 pulsates. Accordingly, the malfunction determination unit 39 monitors the voltages at the power supply lines 41U, 41V and 41W of the electric motor 15, and determines whether a malfunction has occurred. In FIG. 2, the voltages at the three-phases are collectively referred to as Vx.

If one of the power supply lines 41U, 41V and 41W of the electric motor 15 is broken, although the electric motor 15 is able to rotate, the torque output from the electric motor 15 pulsates. When such a break in the power supply line occurs, the current deviation value calculated through the current feedback control does not become equal to zero. Accordingly, when the deviation current value calculated by the current deviation calculation unit 35 and indicated by the deviation ΔI signal does not become equal to zero, the malfunction determination unit 39 determines that one of the power supply lines 41U, 41V and 41W is broken.

When determining that a drift has occurred in the output from the steering torque sensor 21, that is, the value detected by the steering torque sensor 21 deviates from the actual value, such drift being a factor responsible for abnormal torque fluctuations or a torque clockwise/counterclockwise variation; that a malfunction has occurred in at least one of the current sensors 42U, 42V and 42W; that a malfunction has occurred in the motor drive system, for example, in the PWM voltage production unit 37 or the inverter circuit 38; or that at least one of the power supply lines 41U, 41V and 41W that lead to the electric motor 15 has been broken, the malfunction determination unit 39 transmits a malfunction determination signal indicating the type of the malfunction to a malfunction-time control change command unit 40. When a major malfunction that differs from the malfunctions described above is detected, or when an assist stop command is received from another control system, the electronic control unit 30 stops the operation of the entire control system using a malfunction processing function unit (not shown).

The malfunction-time control change command unit 40 receives, in addition to the malfunction determination signal, a signal indicating the vehicle speed v from the vehicle speed sensor 22. When a malfunction determination signal is output from the malfunction determination unit 39 and the vehicle speed v is higher than the reference speed v0, the malfunction-time control change command unit 40 outputs a command for stopping the steering assist. In response to this stop command, the steering assist is stopped. For example, the motor relays 43U and 43V are turned off to shut off the supply of electricity to the electric motor 15. When a malfunction determination signal is output from the malfunction determination unit 39 and the vehicle speed v is equal to or lower than the reference speed v0, the malfunction-time control change command unit 40 transmits a command for changing the control manner to the base assist torque calculation unit 31 and the compensation torque calculation unit 32, and transmits a malfunction identification signal indicating the type of the malfunction to the base assist torque calculation unit 31.

The base assist torque calculation unit 31 sets the assist map to be used to the malfunction-time assist map according to the control manner change command received from the malfunction-time control change command unit 40, and calculates the base assist torque Tas using the malfunction-time assist map. When the malfunction identification signal received from the malfunction-time control change command unit 40 indicates that a malfunction has occurred in one of the current sensors 42U, 42V and 42W, the base assist torque calculation unit 31 outputs a stop command PWM OFF for stopping the output from the PWM voltage production unit 37 when the value of the steering torque Th enters the dead band. When a malfunction identification signal indicates that a malfunctions has occurred in one of the phases of the motor drive system, the base assist torque calculation unit 31 outputs an OFF signal MR OFF to the motor relays 43U and 43V.

The compensation torque calculation unit 32 stops the calculation of the compensation torque upon reception of a control manner change command from the malfunction-time control change command 40. The compensation torque calculation unit 32 then sets the value of the compensation torque Tc to zero, and transmits a signal indicating the compensation torque Tc of zero to the target assist torque calculation unit 33.

The terms such as torques Th, Tas, Tc, and T*, currents Ix, I*, IUx, IVx, IWx, and ΔI, voltage Vx, steering angular speed ω, steering angle θ, and vehicle speed v signify the information indicating the magnitudes and directions thereof.

Figure 3:
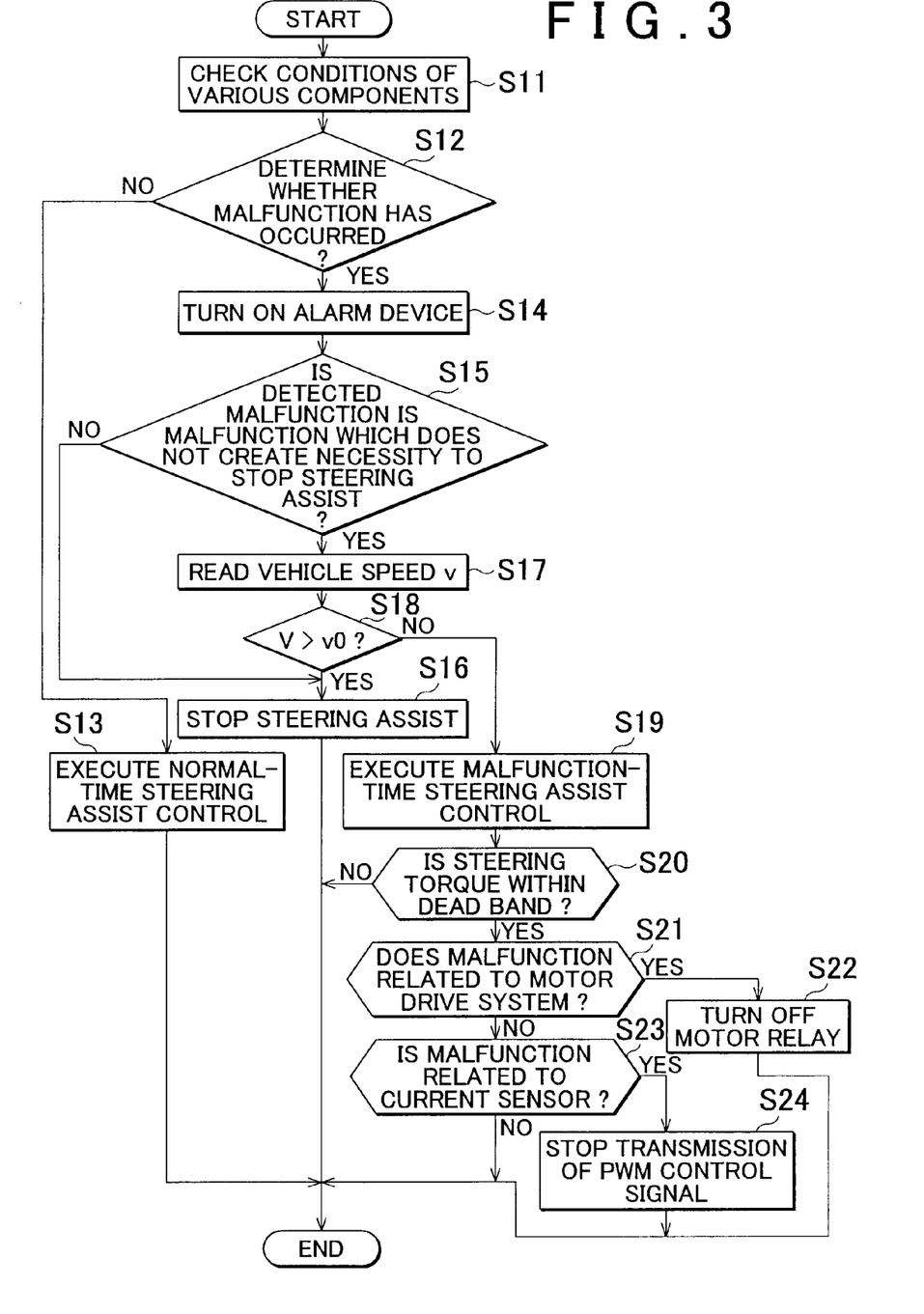
FIG. 3 is a flowchart showing the assist control routine.

Next, the assist control executed by the electronic control unit 30 configured in the above-described manner will be described with reference to the flowchart in FIG. 3. FIG. 3 shows the assist control routine executed by the electronic control unit 30, and is stored, as the control program, in the ROM of the electronic control unit 30. The assist control routine is prepared by combining the processes executed by the units 31 to 40 of the electronic control unit 30 in association with each other, and arranging the processes in time sequence. The control routine is periodically executed at predetermined short intervals while an ignition switch (not shown) is on.

After the control routine is started, the electronic control unit 30 first checks the conditions of the various components (S11). Next, the electronic control unit 30 determines in step S12 whether a malfunction has occurred. If it is determined in step S12 that there is no malfunction ("NO" in S12), the electronic control unit 30 executes the normal-time steering assist control in step S13. Namely, the electronic control unit 30 calculates the base assist torque Tas using the base assist torque calculation unit 31 with reference to the normal-time assist map, and calculates the compensation torque Tc using the compensation torque calculation unit 32. The electronic control unit 30 sets the target assist torque T* to the value obtained by adding the base assist torque Tas and the compensation torque Tc together, and controls the electric motor 15 through the current feedback control described above. Such normal-time steering assist control is periodically executed unless a malfunction is detected.

If it is determined in step S12 that a malfunction has occurred, the electronic control unit 30 executes step S14 in which the alarm device 25 is turned on. Next, the electronic control unit 30 determines in step S15 whether the detected malfunction is a malfunction that will be a factor responsible for abnormal torque fluctuations or a torque clockwise/counterclockwise variation. If such a malfunction has been detected, it is not necessary to stop the steering assist control. An affirmative determination is made in step S15, if the malfunction determination unit 39 determines that a drift has occurred in the output from the steering torque sensor 21; that a malfunction has occurred in at least one of the current sensors 42U, 42V and 42W; that a malfunction has occurred in the motor drive system; or that at least one of the power supply lines 41U, 41V and 41W of the electric motor 15 has been broken. If the malfunction determination unit 39 determines that a malfunction other than the malfunctions described above has occurred, a negative determination is made in step S15.

If a negative determination is made in step S15, the electronic control unit 30 prohibits the drive control of the electric motor 15 in step S16. Accordingly, the steering assist is stopped. On the other hand, if an affirmative determination is made in step S15, namely, if it is determined that the detected malfunction is a malfunction that will be a factor responsible for abnormal torque fluctuations or a torque clockwise/counterclockwise variation, the steering assist function is still running although not properly. Accordingly, the drive control of the electric motor 15 is permitted depending on the degree of necessity for the steering assist.

The electronic control unit 30 reads, in step S17, the vehicle speed v detected by the vehicle speed sensor 22, and determines whether the vehicle speed v is higher than the predetermined reference speed v0 (S18). When the vehicle is moving at a high speed, the degree of necessity for the steering assist is low. Accordingly, when the vehicle speed v is higher than the reference speed v0, the electronic control unit 30 prohibits the drive control of the electric motor 15 to stop the steering assist (S16).

On the other hand, when the vehicle is moving at a low speed, the burden on the driver in turning the driver's steering wheel 11 is great. Accordingly, if it is determined that the vehicle speed v is equal to or lower than the reference speed v0 ("NO" in S18), the electronic control unit 30 permits the drive control of the electric motor 15 to execute the malfunction-time steering assist control (S19). Namely, the electronic control unit 30 calculates the base assist torque Tas using the base assist torque calculation unit 31 with reference to the malfunction-time assist map, sets the target assist torque T* using the base assist torque Tas, and controls the operation of the electric motor 15 through the current feedback control described above. In this case, because the compensation torque Tc corresponding to the steering angular speed ω is set to zero, the target assist torque T* becomes equal to the base assist torque Tas.

In the malfunction-time steering assist control, the base assist torque Tas (=T*) is calculated using the malfunction-time assist map shown in FIG. 6. As can be seen from the map, the width of the dead band of the steering torque, in which the base assist torque Tas is set to zero, is great. Accordingly, when the driver performs the steering operation with a weak force, the detected steering torque Th is prone to be within the dead band. In this case, the target assist torque T* is set to zero, and a command for driving the electric motor 15 is not issued. On the other hand, when the driver performs the steering operation with a strong force, the detected steering torque is out of the dead band, the predetermined target assist torque T* is set, and drive control of the electric motor 15 is executed.

Namely, if it is determined that a malfunction that will be a factor responsible for abnormal torque fluctuations or a torque clockwise/counterclockwise variation has occurred, the steering assist is provided by the electric motor 15 to the operation of the driver's steering wheel 11, which is intentionally performed with a strong force by the driver. On the other hand, provision of the steering assist by the electric motor 15 to the operation of the driver's steering wheel 11, which is unintentionally performed by the driver with a weak force is prohibited. Accordingly, when the degree of necessity for the steering assist is high, the electric motor 15 is driven to alleviate the burden on the driver. On the other hand, when the degree of necessity for the steering assist by the electric motor 15 is low, the operation of the electric motor 15 is stopped to prevent occurrence of abnormal torque fluctuations and a torque clockwise/counterclockwise variation.

When a malfunction has occurred in the motor drive system, an erroneous operation of the electric motor 15 may not be prevented only by changing the assist map even if the steering torque Th is within the dead band. For example, if a malfunction occurs in one of the U-phase, V-phase and W-phase of the PWM voltage production unit 37 or the inverter circuit 38, the electric motor 15 may be erroneously driven even if the target assist torque T* is set to zero. When a malfunction has occurred in one of the current sensors 42U, 42V and 42W, an erroneous operation of the electric motor 15 may not be prevented only by changing the assist map, and the electric motor 15 may be erroneously driven through the current feedback control even if the steering torque Th is within the dead band. Accordingly, when the malfunction-time steering assist control is executed, the following steps are additionally executed.

The electronic control unit 30 determines in step S20 whether the steering torque Th is within the dead band in the malfunction-time assist map. If it is determined that the steering torque Th is within the dead band ("YES" in S20), the electronic control unit 30 determines in step S21 whether the malfunction is related to the motor drive system. If it is determined that the malfunction is related to the motor drive system ("YES" in S21), the electronic control unit 30 turns off the motor relays 43U and 43V to shut off the supply of electricity to the electric motor 15 (S22). If the malfunction is not related to the motor drive system ("NO" in S21), the electronic control unit 30 determines whether the malfunction is related to one of the current sensors 42U, 42V and 42W (S23). If it is determined that the malfunction is related to one of the current sensors 42U, 42V and 42W ("YES" in S23), the ECU 30 stops transmission of a PWM control signal to the inverter circuit 38 (S24).

Accordingly, when the steering torque Th is within the dead band in the malfunction-time assist map, the operation of the electric motor 15 is reliably stopped even if the detected malfunction is related to the motor drive system or the current sensors 42U, 42V, and 42W. On the other hand, when the steering assist torque Th is out of the dead band or when the detected malfunction is related to neither the motor drive system nor the current sensors 42U, 42V, and 42W, the ECU 30 controls the amount of electricity passed to the electric motor 15 based on the target assist torque T* set using the malfunction-time assist map, without executing steps S22 and S24.

In the above-described assist control routine, the steering assist is prohibited or permitted based on whether the vehicle speed v is higher than the reference speed v0 (S18). The reference speed v0 may be allowed to have a hysteresis property. For example, when the vehicle speed v exceeds the first reference speed v01, the steering assist may be prohibited, and when the vehicle speed is reduced and becomes equal to or lower than the second reference speed v02 which is lower than the first reference speed v01 (v02<v01), the steering assist may be permitted. In this case, the width of the hysteresis is from v01 to v02. Alternatively, the determination as to whether the vehicle speed v is higher than the reference speed v0 may be continuously executed for a predetermined time. When it is determined that the predetermined time has elapsed since the determination is started, the steering assist may be permitted or prohibited.

With the electric power steering apparatus according to the embodiment of the invention, in the event of the occurrence of abnormal torque fluctuations or a torque clockwise/counterclockwise variation, the drive control of the electric motor 15 is executed depending on the degree of necessity for reduction in a sense of discomfort in the steering operation and the degree of necessity for reduction in the force required to perform the steering operation. Namely, when the vehicle speed is low and the degree of necessity for the steering assist is high, the electric motor 15 is driven to produce a steering assist torque in order to reduce the burden on the driver. On the other hand, when the vehicle speed is high and the degree of necessity for the steering assist is low, the operation of the electric motor is prohibited in order to minimize a sense of discomfort in the steering operation.

In addition, in such a malfunction state, the assist map is changed to the malfunction-time assist map in which the width of the dead band of the steering torque is greater than that in the normal state. Accordingly, even when the vehicle is moving at a low speed, if the degree of necessity for the steering assist is low, namely, if the driver unintentionally performs the steering operation with a considerably weak force, the operation of the electric motor 15 is prohibited. Therefore, the driver does not feel a sense of discomfort, for example, abnormal torque fluctuations or a torque clockwise/counterclockwise variation. On the other hand, when the driver performs the steering operation with a great force, for example, when the driver causes the vehicle to make a turn, the steering torque falls outside the dead band and the steering assist torque is produced by the operation of the electric motor 15. As a result, the burden on the driver is reduced.

The driver is more prone to feel a sense of discomfort, for example, abnormal torque fluctuations or a torque clockwise/counterclockwise variation, when the steering torque is low. However, increasing the width of the dead band of the steering torque effectively reduces such sense of discomfort felt by the driver. Even in the case where the dead band of the steering torque is set using the assist map, when a malfunction, which does not create a necessity to stop the operation of the electric motor 15 (a malfunction in the motor drive system or the electric sensors), has occurred, the power supply lines that lead to the electric motor 15 are shut off or issuance of the PWM control signal is stopped, whereby the operation of the electric motor 15 is reliably stopped. In addition, because the alarm device 25 is turned on also when such malfunction-time steering assist control is executed, the driver can recognize occurrence of the malfunction even before the steering assist control is stopped. Accordingly, a request for repair is issued at an early stage.

While the invention has been described with reference to the example embodiment thereof, it is to be understood that the invention is not limited to the example embodiments or constructions. To the contrary, the invention is intended to cover various modifications and equivalent arrangements within the scope of the invention. For example, in the embodiment of the invention described above, the sensor that changes the electric resistance in accordance with the torsional angle of the torsion bar is used as the steering torque sensor. Alternatively, another type of sensor, for example, a sensor that changes the magnetic resistance in accordance with the torsional angle of the torsion bar may be used as the steering torque sensor. Further alternatively, a resolver torque sensor may be used as the steering torque sensor. The resolver torque sensor detects the rotational angles of the upper portion and the lower portion of the torsion bar using two resolver sensors, and detects the steering torque based on the difference between the two detected rotational angles. In this case, if a malfunction occurs in the resolver sensor, abnormal torque fluctuations may occur during the steering assist control.

The resolver sensor includes a resolver rotor that rotates together with the torsion bar, and a resolver stator that faces the resolver rotor and that is fixed at the vehicle body side. A primary coil that is an exciting coil is provided to one of the resolver rotor and the resolver stator. A pair of secondary coils that are detection coils is provided to the other of the resolver rotor and the resolver stator such that the two secondary coils are offset from each other by a phase of $\pi/2$. By energizing the primary coil according to a sine-wave signal, two types of induced voltage signals (a sine-wave signal and a cosine-wave signal) in accordance with a rotational angle are output to the secondary coils. The resolver sensor detects the rotational angle position by calculating the amplitude ratio between the voltages signals from the secondary coils.

Figure 11:
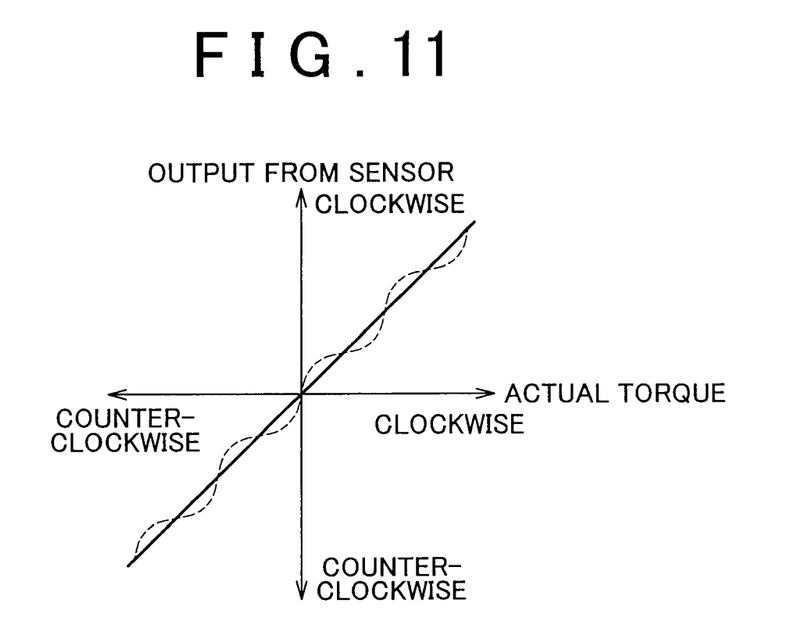
FIG. 11 is a graph showing the detection characteristics of the steering torque sensor.

However, if the output from one of the secondary coils of the resolver sensor is reduced, the amplitude ratio between the two voltages signals from the secondary coils deviates from that in the normal state. As a result, the linearity of the detection value of the rotational angle is lost, and the detection value of the rotational angle pulsates with respect to the actual rotational angle. Accordingly, as indicated by the dashed line in FIG. 11, the value detected by the steering torque sensor using the resolver sensor loses its linearity, and the output from the electric motor pulsates during the steering assist control. The solid line in FIG. 11 shows the torque detection characteristics in the normal state.

Whether a malfunction has occurred in the resolver sensor is determined by determining whether the total sum ($Va^2 + Vb^2$), which is obtained by adding together the values that are obtained by raising the amplitude values (Va, Vb) of the voltage signals of the secondary coils to the second power, is outside the predetermined appropriate range. Accordingly, when the steering torque sensor formed of a resolver sensor is used, signals output from the secondary coils of the resolver sensor are read by the malfunction determination unit 39, and whether a malfunction has occurred is determined in the manner described above.

According to the embodiment of the invention, it is determined whether at least one of a malfunction that will be a factor responsible for abnormal torque fluctuations and a malfunction that will be a factor responsible for a torque clockwise/counterclockwise variation has occurred. Alternatively, it may be determined whether a malfunction that will be a factor responsible for abnormal torque fluctuations has occurred, or it may be determined whether a malfunction that will be a factor responsible for a torque clockwise/counterclockwise variation has occurred. Also, the steering torque sensor may detect the axial force applied to the rack bar 14.

While the invention has been described with reference to what are considered to be an example embodiment thereof, it is to be understood that the invention is not limited to the described embodiment or constructions. On the contrary, the invention is intended to cover various modifications and equivalent arrangements. In addition, while the various elements of the described invention are shown in various combinations and configurations, which are exemplary, other combinations and configurations, including more, less or only a single element, are also within the scope of the invention.

What is claimed is:

1. An electric power steering apparatus, comprising:
    a torque sensor that detects a steering torque which is applied by a steering operation of a driver's steering wheel;
    an electric motor that produces a steering assist torque used to assist the steering operation of the driver's steering wheel;
    an assist control unit that calculates a target assist torque based on at least the detected steering torque, and that executes drive control of the electric motor based on the calculated target assist torque;
    a vehicle speed detection unit that obtains vehicle-speed information concerning a vehicle speed at which a vehicle is moving;
    a malfunction determination unit that determines presence or absence of at least one of an abnormal torque fluctuation, which is a phenomenon in which a torque output from the electric motor abnormally fluctuates, and a torque clockwise/counterclockwise variation, which is a phenomenon in which the torque output from the electric motor varies between clockwise and counterclockwise turning operations of the driver's steering wheel that are performed with the same degree of steering torque; and
    a malfunction-time control unit that permits the drive control of the electric motor executed by the assist control unit when the vehicle speed is equal to or lower than a predetermined speed, and that prohibits the drive control of the electric motor executed by the assist control unit when the vehicle speed is higher than the predetermined speed, in a case where at least one of the abnormal torque fluctuation and the torque clockwise/counterclockwise variation is detected by the malfunction determination unit.

2. The electric power steering apparatus according to claim 1, wherein
    the assist control unit stores normal-time calculation data based on which the target assist torque is set to a higher value as the detected steering torque is higher, and malfunction-time calculation data that has a dead band of the steering torque, where the target assist torque is set to zero, a width of the dead band being greater than a width of a dead band in the normal-time calculation data,
    when neither the abnormal torque fluctuation nor the torque clockwise/counterclockwise variation is detected by the malfunction determination unit, the assist control unit calculates the target assist torque based on the normal-time calculation data, and
    when at least one of the abnormal torque fluctuation and the torque clockwise/counterclockwise variation is detected by the malfunction determination unit and the drive control of the electric motor is permitted, the assist control unit calculates the target assist torque based on the malfunction-time calculation data.

3. The electric power steering apparatus according to claim 2, wherein
    the malfunction determination unit determines the presence or absence of the abnormal torque fluctuation or the torque clockwise/counterclockwise variation by determining whether a malfunction has occurred in the torque sensor.

4. The electric power steering apparatus according to claim 2, wherein
    the malfunction determination unit determines the presence or absence of the abnormal torque fluctuation by determining whether a malfunction has occurred in a power supply line through which electricity is supplied to the electric motor.

5. The electric power steering apparatus according to claim 2, wherein
    the assist control unit is provided with a current sensor that detects a current value of an electric current passed to the electric motor, and executes a feedback control such that the current value becomes equal to a target current value that corresponds to the target assist torque, and
    the malfunction determination unit determines the presence or absence of the abnormal torque fluctuation by determining whether a malfunction has occurred in the current sensor.

6. The electric power steering apparatus according to claim 5, wherein
    the assist control unit calculates the target assist torque based on the malfunction-time calculation data, when it is determined that a malfunction has occurred in the current sensor and the drive control of the electric motor is permitted,
    the assist control unit executes the drive control of the electric motor based on the calculated target assist torque, and
    the assist control unit stops an operation of a drive unit used to drive the electric motor, when the detected steering torque is within the dead band set in the malfunction-time calculation data.

7. The electric power steering apparatus according to claim 2, wherein
    the malfunction determination unit determines the presence or absence of the abnormal torque fluctuation by determining whether a malfunction has occurred in a drive unit used to drive the electric motor.

8. The electric power steering apparatus according to claim 7, wherein
    the assist control unit calculates the target assist torque based on the malfunction-time calculation data, when it is determined that a malfunction has occurred in the drive unit used to drive the electric motor and the drive control of the electric motor is permitted,
    the assist control unit executes the drive control of the electric motor based on the calculated target assist torque, and
    the assist control unit shuts off a supply of electricity to the electric motor through a power supply line, when the detected steering torque is within the dead band set in the malfunction-time calculation data.

9. A method for controlling an electric power steering apparatus which includes a torque sensor that detects a steering torque which is applied by a steering operation of a driver's steering wheel, and an assist control unit that calculates a target assist torque based on at least the detected steering torque, and that executes drive control of an electric motor based on the calculated target assist torque, and which drives the electric motor to produce a steering assist torque used to assist the steering operation of the driver's steering wheel, comprising:

obtaining vehicle-speed information concerning a vehicle speed at which a vehicle is moving;

determining presence or absence of at least one of an abnormal torque fluctuation, which is a phenomenon in which a torque output from the electric motor abnormally fluctuates, and a torque clockwise/counterclockwise variation, which is a phenomenon in which the torque output from the electric motor varies between clockwise and counterclockwise turning operations of the driver's steering wheel that are performed with the same degree of steering torque;

permitting the drive control of the electric motor executed by the assist control unit when the vehicle speed is equal to or lower than a predetermined speed; and prohibiting the drive control of the electric motor executed by the assist control unit when the vehicle speed is higher than the predetermined speed, in a case where at least one of the abnormal torque fluctuation and the torque clockwise/counterclockwise variation is detected.

* * * * *